US008232679B2

(12) United States Patent
Bobb et al.

(10) Patent No.: US 8,232,679 B2
(45) Date of Patent: Jul. 31, 2012

(54) UNINTERRUPTIBLE POWER SUPPLIES WITH CONVERTER OPERATION CONDITIONED UPON STATIC SWITCH COMMUTATION AND METHODS OF OPERATION THEREOF

(75) Inventors: Rennie Bobb, Wake Forest, NC (US); Paul Lukosius, Wake Forest, NC (US); Frederick Tassitino, Jr., Wake Forest, NC (US); John Tracy, Raleigh, NC (US)

(73) Assignee: Eaton Corporation, Cleveland, OH (US)

( * ) Notice: Subject to any disclaimer, the term of this patent is extended or adjusted under 35 U.S.C. 154(b) by 2118 days.

(21) Appl. No.: 10/374,291

(22) Filed: Feb. 25, 2003

(65) Prior Publication Data
US 2004/0164617 A1     Aug. 26, 2004

(51) Int. Cl.
*H02J 1/00* (2006.01)
(52) U.S. Cl. .......................................................... 307/85
(58) Field of Classification Search .................... 307/64, 307/85, 45, 48
See application file for complete search history.

(56) References Cited

U.S. PATENT DOCUMENTS

| 4,065,711 A * | 12/1977 | Kawabata ..................... 320/128 |
| 4,473,756 A | 9/1984 | Brigden et al. ................. 307/66 |
| 4,782,241 A | 11/1988 | Baker et al. |
| 5,210,685 A * | 5/1993 | Rosa ............................. 363/109 |
| 6,940,187 B2 * | 9/2005 | Escobar et al. ................. 307/64 |
| 2003/0062774 A1 * | 4/2003 | Escobar et al. ................. 307/64 |

FOREIGN PATENT DOCUMENTS

| EP | 0514171 | 11/1992 |
| EP | 1160965 | 12/2001 |

OTHER PUBLICATIONS

International Search Report; Corresponding Application No. PCT/IB2004/000741; Sep. 1, 2004 (3 pages).
International Preliminary Report on Patentability and Written Opinion of the International Searching Authority; Corresponding Application No. PCT/IB2004/000741; Aug. 26, 2005; (7 pages).
Examination Report; Corresponding Application No. PCT/IB2004/000741; Apr. 15, 2009.

* cited by examiner

*Primary Examiner* — Daniel Cavallari
(74) *Attorney, Agent, or Firm* — Myers Bigel Sibley & Sajovec, P.A.

(57) ABSTRACT

A UPS is operated by deasserting a static switch drive signal, e.g., a gate signal to a thyristor, and then delaying provision of power from a converter circuit of the UPS, e.g., an inverter or other source of AC power, until after the switch has current commutated to an off state. For example, expiration of a predetermined time interval following deassertion of the switch drive signal may be detected, and the converter circuit may be enabled to drive the output of the UPS responsive to the detected expiration of the predetermined time interval. Alternatively, a current in the static switch may be detected, and the converter circuit may be enabled to drive the output of the UPS responsive to the detected current. The invention may be embodied as methods and apparatus.

18 Claims, 3 Drawing Sheets

US 8,232,679 B2

UNINTERRUPTIBLE POWER SUPPLIES WITH CONVERTER OPERATION CONDITIONED UPON STATIC SWITCH COMMUTATION AND METHODS OF OPERATION THEREOF

BACKGROUND OF THE INVENTION

The invention relates to power conversion apparatus and methods, and more particularly, to uninterruptible power supplies (UPSs) and methods of operation thereof.

Power supply circuits are commonly used in equipment such as UPSs, motor drives, and other applications. Conventional UPSs use a variety of different circuit topologies, including standby, line-interactive and on-line topologies. Generally, each of these topologies has advantages and disadvantages and, accordingly, selection of a particular topology is typically governed by the needs of the application.

A common feature of many types of UPSs is the use of a transfer switch that is operative to transfer the load at the output of the UPS between the AC utility and a converter circuit, e.g., an inverter, cycloconverter, etc., that can supply AC power to the load. Such transfer switches may be referred to using various names, such as "static switch" or "bypass switch," generally depending on the nature of the UPS involved. In many conventional UPSs, such transfer switches are implemented using thyristor circuits, typically antiparallel connected silicon controlled rectifiers (SCRs).

SUMMARY OF THE INVENTION

In some embodiments of the invention, a switch drive signal is asserted at a static switch, e.g., a thyristor, to couple an AC source at an AC input of the UPS to an AC output of a UPS through the switch. Power is provided from a converter circuit of the UPS coupled to the output of the UPS after deassertion of the drive signal and after the switch has current commutated to an off state. In some embodiments, expiration of a predetermined time interval following deassertion of the switch drive signal is determined, and the converter circuit is enabled to drive the output of the UPS responsive to the detected expiration of the predetermined time interval. In further embodiments, a current in the switch is detected and the converter circuit is enabled to drive the output of the UPS responsive to the detected current. The invention may be embodied as methods and apparatus.

Embodiments of the invention can avoid undesirable effects associated with conventional UPS operations. In particular, by delaying application of power from an inverter or other type of converter circuit used to generate AC power at the output of the UPS until the static or bypass switch current commutates, delay in the commutation of the switch can be reduced, and the output of the converter circuit may be more quickly brought within specification.

DETAILED DESCRIPTION

Figure 1:
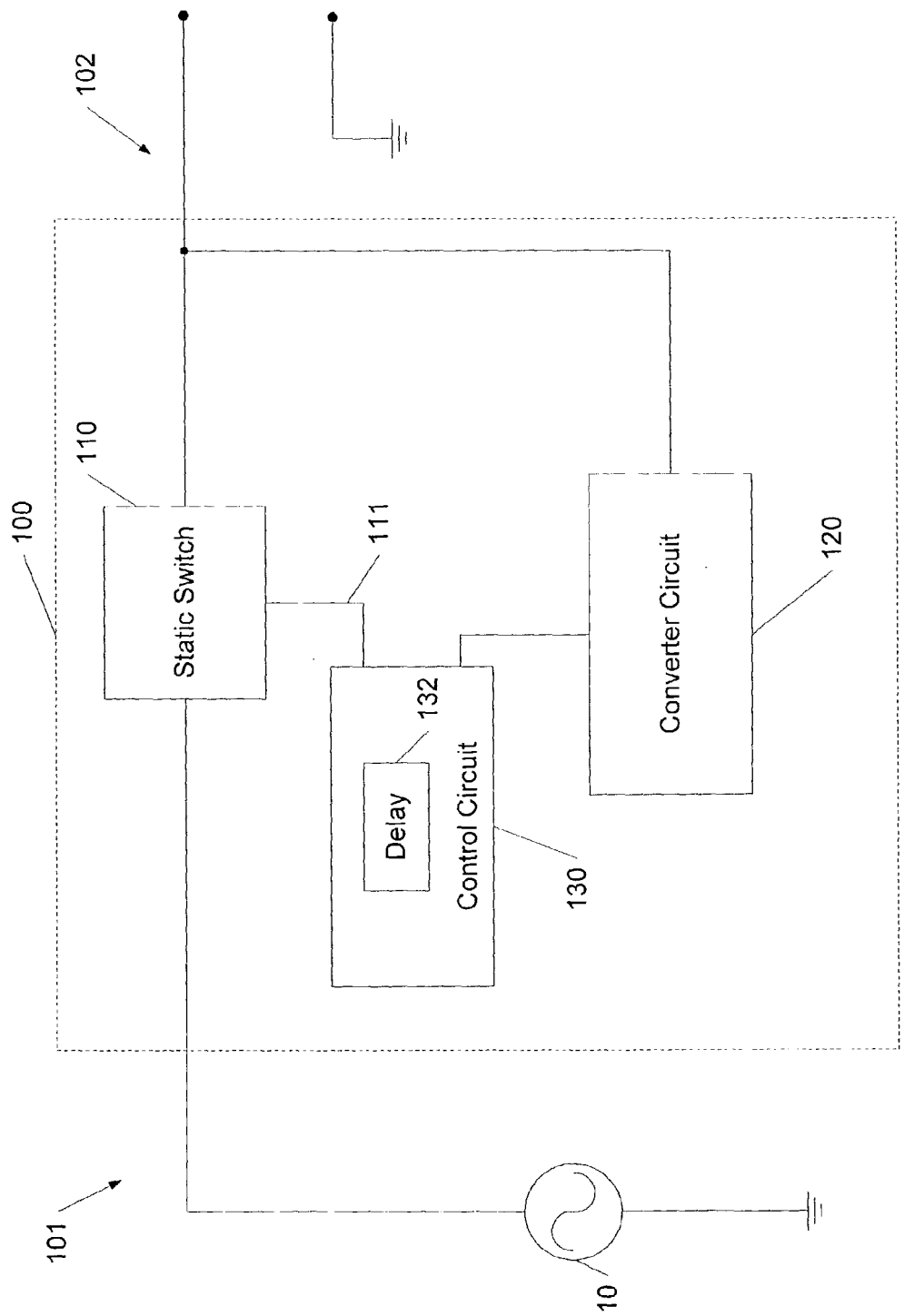
FIG. 1 illustrates a UPS according to some embodiments of the invention.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present.

The invention stems from a realization that, while is it is desirable to use thyristor-type, e.g., SCR, static switches in UPS applications because of their typically low cost and high reliability, conventional operation of such current-commutated static switches can have undesirable effects. For example, if an inverter or other converter circuit that is used to drive the output of a UPS is enabled while a thyristor-type (e.g., back to back SCR) static switch is being commutated, it may take several millisecond before the static switch actually commutates to an off state. In particular, driving the output of the UPS with such a converter circuit before the static switch has turned off can delay commutation of the switch for up to ½ cycle (i.e., 8 milliseconds for a 60 Hz waveform), as the converter may supply current that maintains the switch in an "on" state for such a period. While the switch remains on, the converter circuit may have to drive an extremely low impedance (e.g., a short circuit) at the input for a relatively long period of time, which may trigger an extended transient in the operation of the converter circuit and, in turn, may cause the output of the UPS to be out of specification for an undesirably long period of time.

Various embodiments of the invention can avoid such problems by doing something that may appear counterintuitive, namely, delaying application of power from a converter circuit (e.g., inverter) of a UPS when transitioning to operation powered by the converter circuit. For example, because current commutation of an SCR static switch of a UPS may occur in a matter of a few hundred microseconds if the converter circuit of the UPS is inhibited, the output of the converter circuit may be more quickly brought within specification if it is not enabled while the static switch is being current commutated.

FIG. 1 illustrates a UPS 100 according to some embodiments of the invention. The UPS includes an input 101 configured to be coupled to an AC source 10, and an output 102 configured to be coupled to a load. The UPS 100 also includes a converter circuit 120 that is operative to generate an AC voltage at the output 102, under control of a control circuit 130. The UPS 100 further includes a current-commutated switch 110 that is coupled between the input 101 and the output 102. The current-commutated switch 110 couples the input 101 to the output 102, bypassing the converter circuit 120, responsive to assertion of a drive signal 111, here shown as generated by the control circuit 130. The current-commuted switch 110 is further operative to current commutate to an off state following deassertion of the drive signal 111. As further illustrated, the control circuit 130 includes delay circuitry 132 that delays enabling of the converter circuit 120 with respect to deassertion of the drive signal 111.

Figure 2:
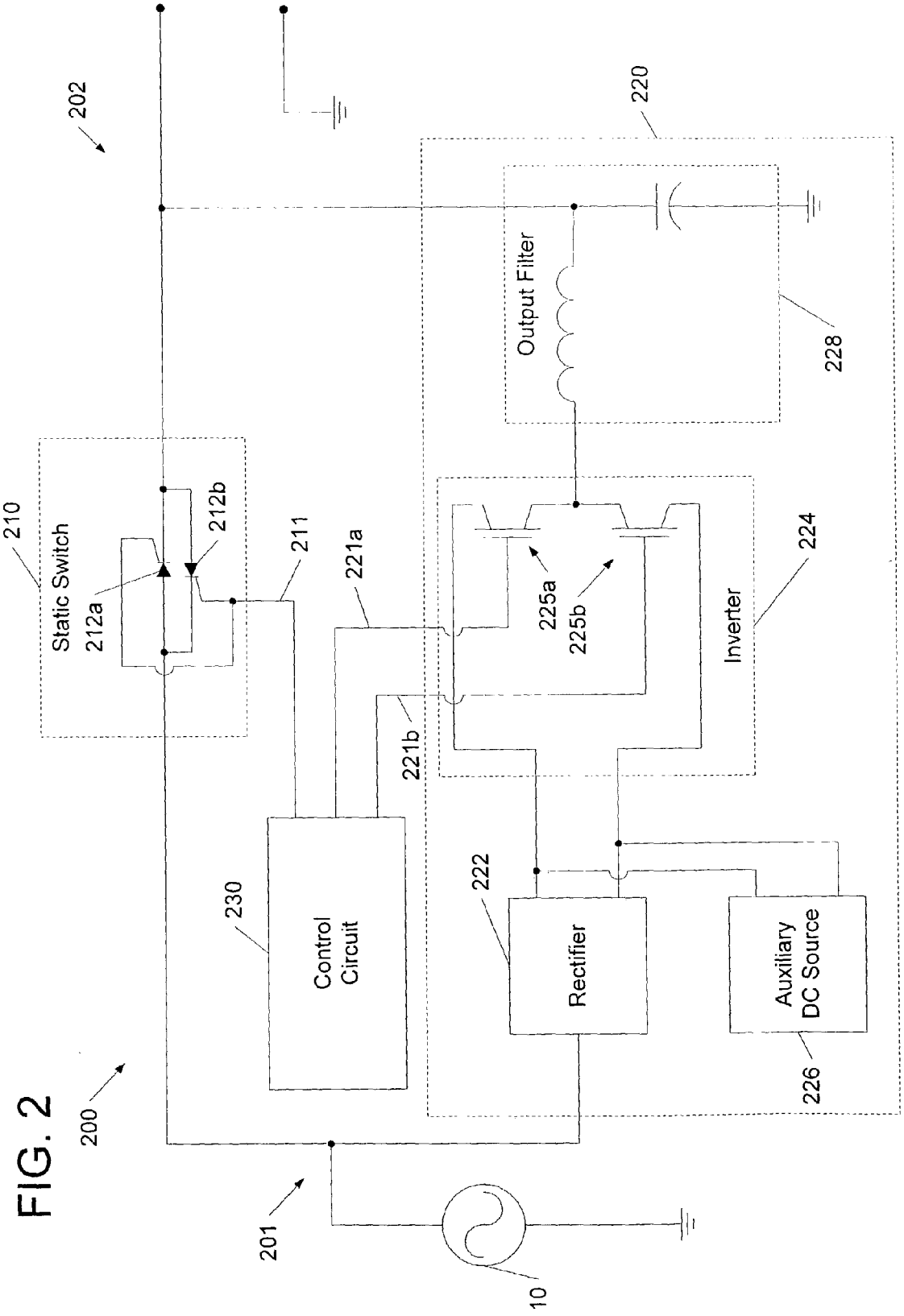
FIG. 2 illustrates a UPS according to further embodiments of the invention.

FIG. 2 illustrates a UPS 200 according to further embodiments of the invention. The UPS 200 includes an input 201 configured to be coupled to an AC source 10, and an output 202 configured to be coupled to a load. The UPS 200 also includes a double-conversion type converter circuit 220 comprising a rectifier circuit 222 coupled to the input 201, and an inverter circuit 224 that receives DC power from the rectifier 222. As shown, the inverter circuit 224 comprises first and second insulated-gate bipolar transistors (IGBTs) 225a, 225b connected in a bridge configuration. The converter circuit 220 also includes an alternative DC power source 226, which can also provide DC power to the inverter 224, and an output filter 228.

The UPS 200 further includes a thyristor-type static switch 210, including anti-parallel connected SCRs 212a, 212b, coupled between the input 201 and the output 202. A control circuit 230 controls the static switch 210 and the converter circuit 220. In particular, the control circuit 230 generates a drive signal 211 that drives the SCRs 212a, 212b, and drive signals 221a, 221b that drive the inverter IGBTs 225a, 225b. Enablement of the transistor drive signals 221a, 221b is delayed with respect to deassertion of the static drive signal 211, such that the IGBTs 225a, 225b remain in a high-impedance state until the static switch 210 current commutates to an "off" state. During this inhibited interval, current supplied to the switch 210 is generally governed by capacitance at the output 202. Assuming capacitance at the output 202 is relatively small, current in the switch 201 can be forced to decay relatively rapidly (e.g., on the order of a few hundred microseconds), and additional delays in commutation of the switch 210 due to current supplied by the inverter circuit 224 can be prevented.

Figure 3:
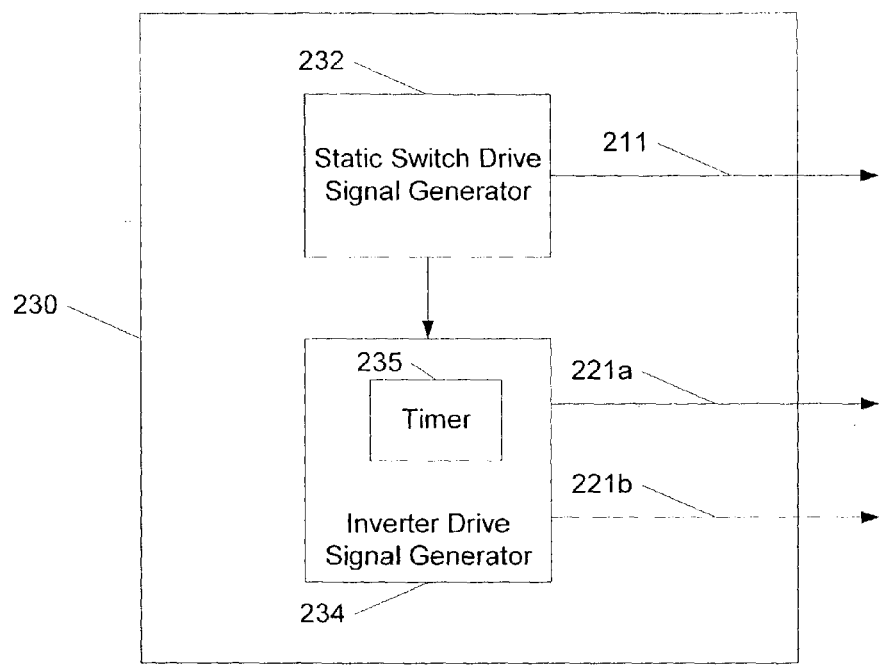
FIG. 3 illustrates a control circuit according to some embodiments of the invention.

As shown in FIG. 3, the control circuit 230 may include a static switch drive signal generator circuit 232 that generates the static switch drive signal 211, and an inverter transistor drive signal generator circuit 234, including a timer circuit 235, that generates the transistor drive signals 221a, 221b responsive to the static switch drive signal generator circuit 232, i.e., prevents assertion of the transistor drive signals 221a, 221b until a predetermined time interval identified by the timer circuit 235 following deassertion of the static switch drive signal 211 elapses. It will be understood that the static switch drive signal generator circuit 232 and the inverter transistor drive signal generator circuit 234 may be implemented in a number of different ways, using a variety of different types of digital circuits and/or analog circuits. For example, the static switch drive signal generator circuit 232 and the inverter transistor drive signal generator circuit 234 may be implemented using program code executing in a data processing circuit, such as a microprocessor, microcontroller, or digital signal processor (DSP). Further description of specific circuit implementations providing the aforedescribed functionality will not be provided herein, as such specific circuitry can be developed by those of ordinary skill in the art without undue experimentation in view of the teachings of this disclosure.

Figure 4:
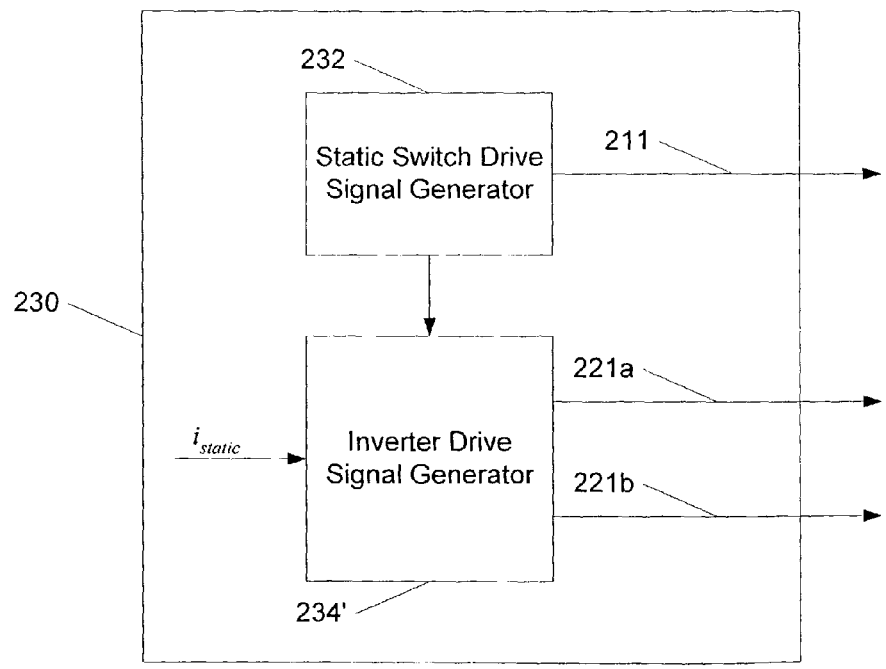
FIG. 4 illustrates a control circuit according to further embodiments of the invention.

An alternative approach is illustrated in FIG. 4. Here, the control circuit 230 includes a static switch drive signal generator circuit 232 that generates the static switch drive signal 211, and an inverter transistor drive signal generator circuit 234' that conditions generation of the transistor drive signals 221a, 221b on a detected current $i_{static}$ in the static switch 210, i.e., that prevents assertion of the transistor drive signals 221a, 221b until the current $i_{static}$ in the static switch 210 meets a predetermined criterion that is indicative of commutation to an off state. It will be understood that the static switch drive signal generator circuit 232 and the inverter transistor drive signal generator circuit 234' may be implemented in a number of different ways, using a variety of different types of digital circuits and/or analog circuits. For example, the static switch drive signal generator circuit 232 and the inverter transistor drive signal generator circuit 234' may be implemented using program code executing in a data processing circuit, such as a microprocessor, microcontroller, or digital signal processor (DSP). Further description of specific circuit implementations providing the aforedescribed functionality will not be provided herein, as such specific circuitry can be developed by those of ordinary skill in the art without undue experimentation.

Although the foregoing illustrated embodiments include specific thyristor-type transfer switches, it will be appreciated that the invention is also applicable to other types of switch arrangements. It will also be appreciated that the invention encompasses both single-phase and multi-phase UPS applications.

In the drawings and foregoing description thereof, there have been disclosed exemplary embodiments of the invention. Terms employed in the description are used in a generic and descriptive sense and not for purposes of limitation, the scope of the invention being set forth in the following claims.

That which is claimed:

1. A method of operating a UPS, the method comprising:
    asserting a switch drive signal at a switch to couple an AC source at an AC input of the UPS to an AC output of the UPS through the switch;
    deasserting the switch drive signal; and then
    inhibiting control of the AC output of the UPS by a converter circuit of the UPS coupled to the AC output of the UPS until after the switch has current commutated to an off state.

2. A method according to claim 1, comprising current commutating the switch to the off state responsive to discharge of a capacitance at the AC output of the UPS.

3. A method according to claim 1, wherein inhibiting control of the AC output of the UPS by a converter circuit of the UPS coupled to the AC output of the UPS until after the switch has current commutated to an off state comprises:
    detecting expiration of a predetermined time interval following deassertion of the switch drive signal; and
    enabling the converter circuit to drive the AC output of the UPS responsive to the detected expiration of the predetermined time interval.

4. A method according to claim 1, wherein inhibiting control of the AC output of the UPS by a converter circuit of the UPS coupled to the AC output of the UPS until after the switch has current commutated to an off state comprises:
    detecting a current in the switch; and
    enabling the converter circuit to drive the AC output of the UPS responsive to the detected current.

5. A method according to claim 1, wherein the switch comprises a thyristor.

6. A method according to claim 1, wherein inhibiting control of the AC output of the UPS by a converter circuit of the UPS coupled to the AC output of the UPS until after the switch has current commutated to an off state comprises delaying provision of power from an inverter circuit of the UPS.

7. A method according to claim 1, wherein inhibiting control of the AC output of the UPS by a converter circuit of the UPS coupled to the AC output of the UPS until after the switch has current commutated to an off state comprises maintaining an output of the converter circuit coupled to the AC output in a high-impedance state until after the switch has current commutated to the off state.

8. An uninterruptible power supply (UPS), comprising:
    an AC input;
    an AC output;
    a converter circuit operative to generate an AC voltage at the AC output;
    a switch operative to couple an AC source at the AC input to the AC output through the switch in an on state responsive to assertion of a switch drive signal and to decouple the AC input from the AC output in an off state responsive to a current in the switch following deassertion of the switch drive signal; and a control circuit operative to control the converter circuit such that control of the AC output by the converter circuit is inhibited until the switch current commutates to the off state.

9. A UPS according to claim 8, wherein the control circuit is operative to detect expiration of a predetermined time interval following deassertion of the switch drive signal and to enable the converter circuit to drive the AC output of the UPS responsive to the detected expiration of the predetermined time interval.

10. A UPS according to claim 8, wherein the control circuit is operative to detect a current in the switch and to enable the converter circuit to drive the AC output of the UPS responsive to the detected current.

11. A UPS according to claim 8, wherein the switch comprises a thyristor.

12. A UPS according to claim 8, wherein the converter circuit comprises an inverter circuit.

13. A UPS according to claim 8, wherein the control circuit is operative to maintain an output of the converter circuit coupled to the AC output in a high-impedance state until the switch current commutates to the off state.

14. An uninterruptible power supply (UPS), comprising:
an AC input;
an AC output;
an inverter circuit coupled to AC output and operative to generate an AC voltage at the AC output; and
a thyristor coupled between the AC input and the AC output; and
a control circuit operative to inhibit control of the AC output by the inverter circuit until the thyristor commutates to an off state following deassertion of a gate signal at the thyristor.

15. A UPS according to claim 14, wherein the control circuit is operative to detect expiration of a predetermined time interval following deassertion of the gate signal and to enable the inverter circuit responsive to the detected expiration of the predetermined time interval.

16. A UPS according to claim 14, wherein the control circuit is operative to detect a current in the thyristor and to enable the inverter circuit responsive to the detected current.

17. A UPS according to claim 14, wherein the thyristor comprises a pair of anti-parallel connected silicon-controlled rectifiers (SCRs).

18. A UPS according to claim 14, wherein the control circuit is operative to maintain an output of the inverter circuit coupled to the AC output in a high-impedance state until the thyristor commutates to the off state following deassertion of the gate signal at the thyristor.

* * * * *